United States Patent
Roux et al.

(10) Patent No.: US 8,818,086 B2
(45) Date of Patent: Aug. 26, 2014

(54) METHOD FOR IMPROVING THE VISUAL PERCEPTION OF A DIGITAL IMAGE

(75) Inventors: Nicolas Roux, Saint-Jean de Moirans (FR); Trang Chan-Virak, St Ismier (FR); Sébastien Cleyet-Merle, Voiron (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 105 days.

(21) Appl. No.: 13/530,216

(22) Filed: Jun. 22, 2012

(65) Prior Publication Data

US 2012/0328186 A1     Dec. 27, 2012

(30) Foreign Application Priority Data

Jun. 23, 2011  (FR) ...................... 11 01944

(51) Int. Cl.
*G06F 9/34* (2006.01)
*G06K 9/00* (2006.01)
*H04N 1/407* (2006.01)
*G06T 5/40* (2006.01)
*G06T 5/00* (2006.01)

(52) U.S. Cl.
CPC .............. *G06T 5/40* (2013.01); *H04N 1/4072* (2013.01); *G06T 2207/20012* (2013.01); *G06T 2207/10004* (2013.01); *G06T 5/008* (2013.01); *G06T 2207/20021* (2013.01)
USPC .......................................... 382/164; 382/168

(58) Field of Classification Search
CPC .......... G06T 7/0081; G06T 7/408; G06T 5/40
USPC .......................... 382/164, 168, 173, 305, 312
See application file for complete search history.

(56) References Cited

U.S. PATENT DOCUMENTS

| | | | | |
|---|---|---|---|---|
| 5,452,367 A | * | 9/1995 | Bick et al. ...................... | 382/128 |
| 7,460,168 B2 | * | 12/2008 | Horiuchi ........................ | 348/362 |
| 7,525,688 B2 | * | 4/2009 | Matsushima ................... | 358/1.9 |
| 7,884,866 B2 | * | 2/2011 | Yamada et al. ................ | 348/280 |
| 8,269,852 B2 | * | 9/2012 | Shiraishi et al. ............ | 348/222.1 |
| 8,417,064 B2 | * | 4/2013 | Wakazono et al. ............ | 382/298 |

FOREIGN PATENT DOCUMENTS

| | | |
|---|---|---|
| WO | 01/26054 A2 | 4/2001 |
| WO | 2010/024782 A1 | 3/2010 |

OTHER PUBLICATIONS

Chen et al., "Contrast Enhancement Using Recursive Mean-Separate Histogram Equalization for Scalable Brightness Preservation," IEEE Transactions on Consumer Electronics, vol. 49, No. 4, Nov. 1, 2003, pp. 1301-1309.

Xhao et al., "Automatic Digital Image Enhancement for Dark Pictures," Acoustics, Speech and Signal Processing, 2006 IEEE International Conference on Toulouse France, May 14-19, 2006, Piscataway, NJ IEEE, Jan. 1, 2006, pp. II-953-II-956.

Latulipe et al., "symTone: Two-handed Manipulation of Tone Reproduction Curves," Graphics Interface 2006—Proceedings 2006 Canadian Information Processing Society, vol. 2006, pp. 9-16.

* cited by examiner

*Primary Examiner* — Kanjibhai Patel
(74) *Attorney, Agent, or Firm* — Allen, Dyer, Doppelt, Milbrath & Gilchrist, P.A.

(57) ABSTRACT

The method for improving the visual perception of a digital image may comprise dividing the digital image into repetitive areas, and modifying the tone curve and/or the histogram of each area to improve the visual perception of the corresponding area. Lastly, the joins between adjacent areas may be smoothed.

39 Claims, 7 Drawing Sheets

(0,0)

0              MaxCode

METHOD FOR IMPROVING THE VISUAL PERCEPTION OF A DIGITAL IMAGE

FIELD OF THE INVENTION

The invention relates to a method for improving the visual perception of a digital image, in particular, the luminosity and/or contrast thereof.

BACKGROUND OF THE INVENTION

A quality photograph is a photograph where the contrast and luminosity of which are correctly adjusted. However, in a camera, the image sensor is typically adjusted in a global manner according to the measurements of the scene. This often results in overexposure of certain areas of the image and/or underexposure of certain other areas of the image. To improve the luminosity of a digital image, the tone curve of the image can be modified in a global manner.

In FIG. 1, the tone curve corresponds to a line in the form of a diagonal of a square. The line comprises a first end representative of a minimum pixel value and a second end representative of a maximum pixel value in the image involved. The boundaries 0 and MaxCode represent the values which the pixels can take according to their encoding, for example, if a pixel is encoded with 8 bits, it will be able to take 256 different values. According to the encoding, the minimum value of the pixels of the image, the coordinates of which are (0,0), represents a black pixel, and the maximum value represents a white pixel, the coordinates of which are (MaxCode, MaxCode).

By deforming the line between its first end (0,0) and its second end (MaxCode, MaxCode), it is possible to modify the shadows, the mid tones (gamma), and the highlights. Thus, if the details of the shadows are to be accentuated, they are lightened by curving the initial part of the line upwards. If the details of the highlights are to be accentuated, they are darkened by curving the final part of the line downwards. The first method tends to give rise to noise in the shadows, whereas the second method tends to reduce the contrast of the image. In order to adjust the contrast on a digital image, it is possible to modify the histogram of the image in a global manner.

In FIG. 2, the histogram enables the number of pixels to be visualized and counted according to their values. The dark pixels of the image are on the left of the histogram and the light pixels are on the right of the histogram. In general, each bar of the histogram represents a count of the pixels of the image having the same value representative of the associated bar.

To improve the contrast, stretching of the histogram of the image is often performed. In the example of FIG. 2, the histogram comprises few pixels having values close to 0 and few pixels having values close to MaxCode. Histogram stretching (also called "histogram linearization" or "range expansion") comprises spreading the central area, which is the most "populated," over the whole range of the histogram. The most representative intensities are thus distributed over the scale of available values. This has the effect of making the light pixels even lighter and the dark pixels close to black. This method does however have the effect of reducing the detail of the shadows and of the highlights.

In general, to improve visual perception, it is desirable for an image to be contrasted while at the same time providing a sufficient level of detail in the shadows and highlights. This involves improving the luminosity and contrast using the two techniques set out above. However, under difficult exposure conditions (for example, against the light), one of the techniques may cancel out the benefits of the other, in particular, when they are used in global manner on the image.

To improve this situation, techniques that act in a local manner are known. These can, for example, involve UnSharp Masking (USM) and the local contrast improvement technique, which is a variant of the USM technique. These techniques based on contour detection may however be complex to implement, especially in real time in a photographic camera.

SUMMARY OF THE INVENTION

A technique for local processing of digital images may provide satisfactory results while being usable in real time with computing resources that are not very powerful.

A method for improving the visual perception of a digital image may comprise dividing the digital image into a plurality of simple repetitive areas, modifying the tone curve and/or the histogram of each area to improve the visual perception of the corresponding area, and smoothing the joins between adjacent areas.

Modification of the tone curve of an area may comprise determining a first set of pixels corresponding to underexposed parts of the area and a second set of pixels corresponding to overexposed parts of the area, determining a first monitoring point representative of the mean value of the pixels of the first set of pixels, determining a second monitoring point representative of the mean value of the pixels of the second set of pixels, and making the tone curve tend towards a Bezier curve that is a function of the first and second monitoring points. The modifying of the histogram of an area may comprise determining a histogram from the values of the pixels of the area, determining a first reference value of the pixels below which a first reference percentage of pixels of the area is situated, determining a second reference value of the pixels above which a second reference percentage of pixels of the area is situated, and stretching the histogram by distributing the frequencies of occurrence of the pixels situated between the first and second reference values over the width of the histogram.

BRIEF DESCRIPTION OF THE DRAWINGS

Other advantages and features will become more clearly apparent from the following description of particular embodiments of the invention given for non-restrictive example purposes only and represented in the appended drawings, in which.

DETAILED DESCRIPTION OF THE PREFERRED EMBODIMENTS

The methods described in the following differ from typical approaches in that the image is divided into simple repetitive areas, for example, a matrix of squares, and in that the contrast or luminosity of each area is modified in independent manner. Dividing the image into simple repetitive areas increases the probability of the pixels of each area having values close to one another. The modifications made to the area then do not present the defects of the global approach where all the pixels of the image are modified. Division into simple repetitive areas, followed by modification of the tone curves or of the histograms in each area, may require considerably less computing resources than algorithms of the USM technique. After modification, the transitions between the adjacent areas remain to be erased, which is also part of the methods described here.

Figure 1:
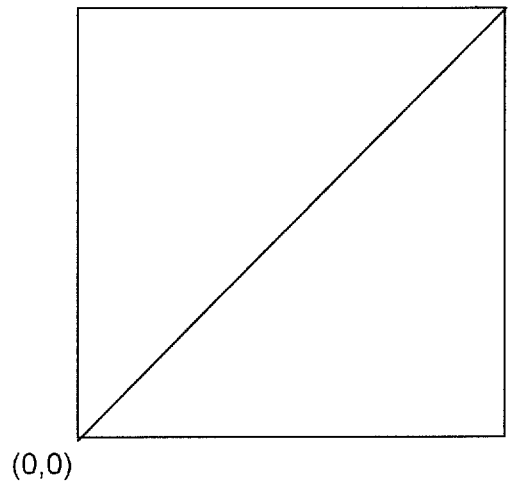
FIG. 1 represents a tone curve of a digital image, according to the prior art.
Figure 2:
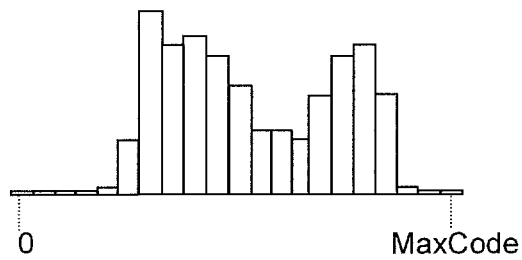
FIG. 2 represents a histogram of a digital image, according to the prior art.
Figure 3:
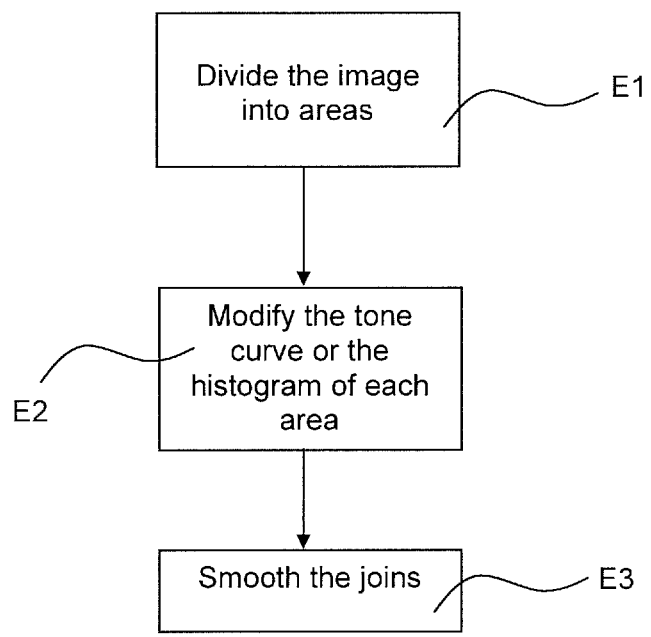
FIG. 3 is a flowchart of a method for improving the visual perception of an image, according to the present invention.

In FIG. 3, the method for improving the visual perception of a digital image comprises a first step E1 in which the digital image is divided into a plurality of simple repetitive areas. An example of division into areas is described further in relation with FIG. 4.

In step E2, the tone curve and/or histogram of each area is modified to improve the visual perception of the corresponding area. What is meant by improving the visual perception is that modification of the tone curve enables the luminosity to be improved and the details of underexposed parts and overexposed parts of the area to be highlighted, and that modification of the histogram enables the contrast of the area to be enhanced.

In step E3, the joins between adjacent areas are smoothed to obtain a coherent image. What is meant by a coherent image is that the independently processed areas are joined without the human eye being able to detect the edges of the areas.

The smoothing step can be performed by typical image matching algorithms from the point of view of the luminosity and colors. Such an algorithm can be bilinear interpolation used in building up panoramic images from several snapshots. For example, a given pixel will be able to be modified according to adjacent pixels. The smoothing steps between two images, or when transformation of an image is performed, conventionally use bilinear interpolation. Interpolation can be performed between different pixels, and any one pixel can be transformed in four different manners. It is in fact possible to interpolate the transformations of each of the four adjacent areas on a current pixel. In other words, four pixels are obtained from a single pixel. Depending on the distance from the current pixel to the area considered, the weight of each of the four transformations is different to moderate the pixel to be processed. After smoothing step E3, each pixel of the original image has been modified according to at least a gain/offset determined by the steps of the method.

These steps of improving the visual perception of the image can be applied on an individual image or on a set of images of a flux from a photographic camera sensor. As the images of the flux are very close to one another, they are representative of the same scene and are considered as being identical from the point of view of the visual perception settings to be used. Each modification of a pixel (for example, a modification of the tone curve and/or of the histogram, and smoothing) of the first image of the scene can thus be recorded in the form of a gain to be applied to the same pixel of all the images of the scene. Each step can also be performed on a different image of the flux.

Figure 4:
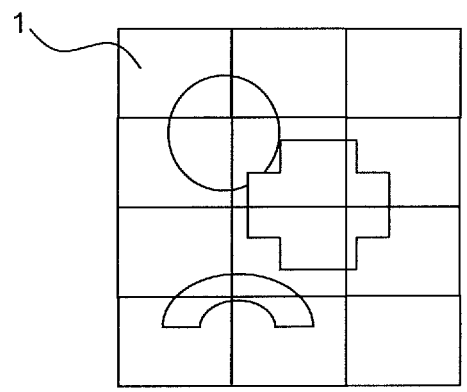
FIG. 4 illustrates an image divided into areas, according to the present invention.

FIG. 4 illustrates an example of the division into areas. The image representative, for example, a scene comprising a circle, a cross and an arc of a circle is divided into a 3×4 matrix of squares 1 or rectangles, other shapes however are possible. Division into matrix form is much simpler to define than detection of outlines used in the typical approaches. It is possible to consider that the simple repetitive areas are areas of identical dimensions repeating themselves in the image so that each pixel of the image belongs at least to one area which is associated therewith.

Figure 5:
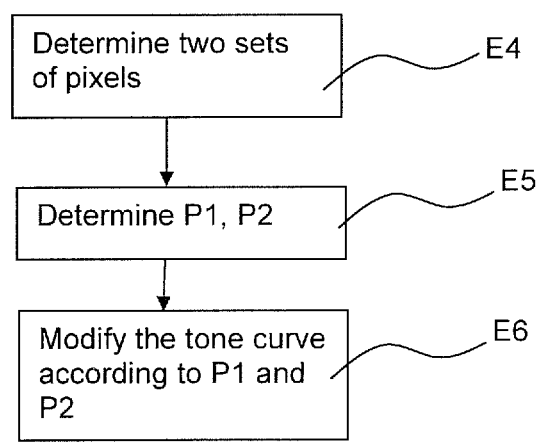
FIG. 5 is a flowchart of a method for improving the luminosity, according to the present invention.

FIG. 5 illustrates a particular embodiment of the method in which it is sought to improve the luminosity by modifying the tone curve of an area. This implementation may be performed for each area. The step of modifying the tone curve comprises a step E4 of determining a first set of pixels representative of underexposed parts of the area, and a second set of pixels representative of overexposed parts of the area. In other words, the area is virtually divided into two different sub-areas, one overexposed area referred to here as the "light area," and the other underexposed area referred to here as the "dark area." The two sub-areas may overlap on a transition strip forming an intersection. In other words, the light and dark areas can have pixels in common. Overlapping makes it possible to limit distortions in the mid tones of the image, which are particularly present with high gains but reversed in each of the light and dark areas. Overlapping avoids modifying the tone curve beyond what is reasonable, which could have the consequence of denaturing the final image.

A step E5 determines a monitoring point $P_1$ representative of the mean value $V_{m1}$ of the pixels of the dark area, and a monitoring point $P_2$ representative of the mean value $V_{m2}$ of the pixels of the light area to be determined. These monitoring points $P_1$ and $P_2$ are then used in a step E6 to adjust the tone curve of the area to make the latter tend to a Bezier curve as a function of the monitoring points $P_1$, $P_2$.

Figure 6:
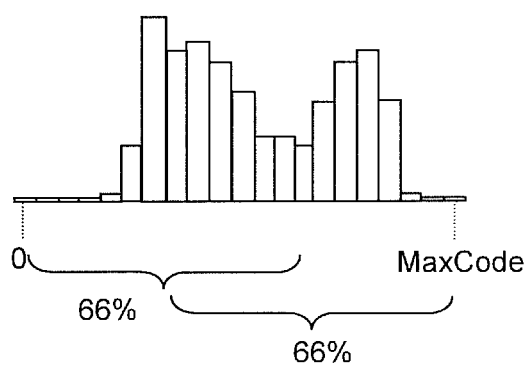
FIG. 6 illustrates a histogram of an area of the image, according to the present invention.

According to an example, a pixel is considered as forming part of the dark area if its value is between 0 and 66% of MaxCode. In like manner, a pixel is considered as forming part of the light area if its value is between less 66% of MaxCode and MaxCode. FIG. 6 illustrates, for example, how the pixels of the same area are distributed over the light and dark areas. Given that a percentage of pixels of the range between 0 and MaxCode is referred to, there is no need to establish the histogram of FIG. 6 beforehand to determine the distribution.

Figure 7:
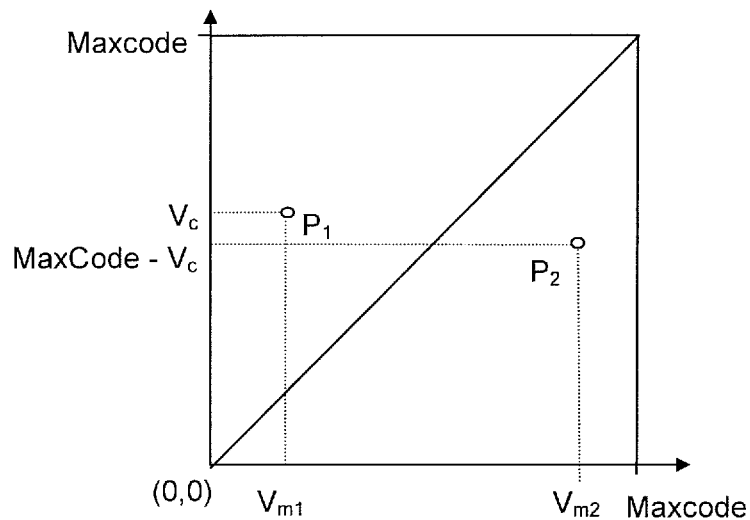
FIGS. 7 to 9 illustrate different tone curves used to modify the rendering of a corresponding area, according to the present invention.

In FIG. 7, the tone curve, before adjustment, is in the form of a line, one of the ends of which represents the point (0, 0), for example, representative of a black pixel, and the other end of which represents the point (MaxCode, MaxCode), for example, representative of a white pixel. The monitoring points $P_1$ and $P_2$ can, in addition to the associated mean values $V_{m1}$ and $V_{m2}$, can be representative of the target exposure values $V_c$ of the pixels. The target exposure value $V_c$ can be used by a self-exposure loop of a sensor which recorded the image, or a higher value than that given by the loop to simulate a more intensive lighting of the photographed scene. This target exposure value $V_c$ is preferably equal to 27% of MaxCode when the range span extends from 0 to MaxCode.

Figure 8:
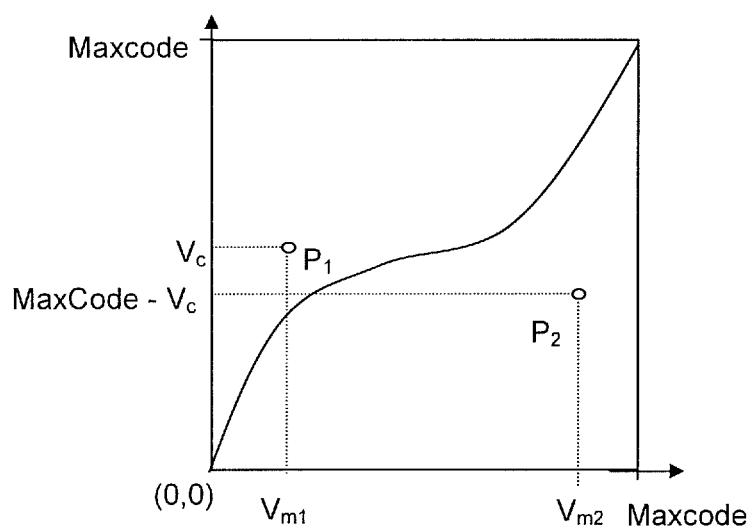

In FIG. 7, monitoring point $P_1$ has as coordinates the mean value $V_{m1}$ of the pixels of the dark area and the target exposure value $V_c$ of the pixels. The monitoring point $P_2$ has as coordinates the mean value $V_{m2}$ of the pixels of the light area and the value MaxCode–$V_c$. In FIG. 8, the tone curve has been replaced by a Bezier curve built up from monitoring points $P_1$ and $P_2$ and from the same ends as the curve of FIG. 7. The detail of the shadows has been accentuated by curving the initial part of the line upwards (part on the left in FIG. 8), and the detail of the highlights has been accentuated by curving the final part of the line downwards (part on the right of FIG. 8). These curvatures that are dependent on points $P_1$ and $P_2$ are therefore dependent on the properties of the area and not on the whole of the image.

Figure 9:
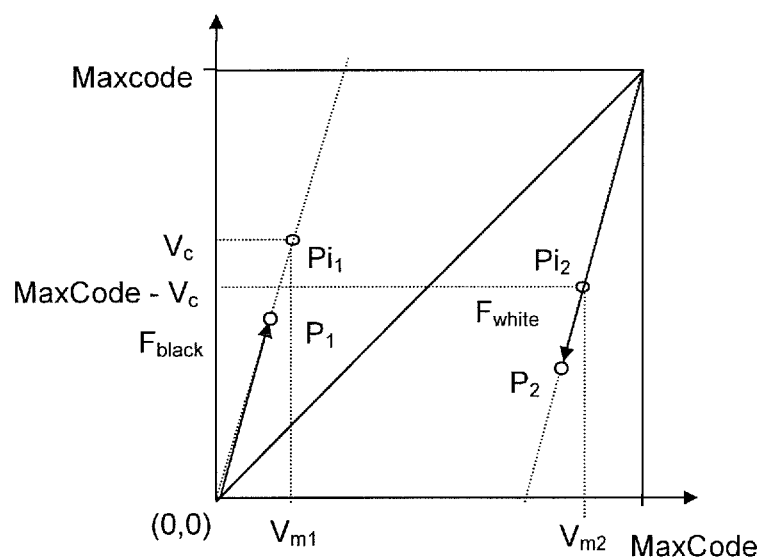

According to an alternative embodiment illustrated in FIG. 9, monitoring points $P_1$ and $P_2$ are obtained by way of respective intermediate points $Pi_1$ and $Pi_2$. These intermediate points $Pi_1$ and $Pi_2$ are obtained by way of the methodology described in the foregoing for points $P_1$ and $P_2$. Monitoring point $P_1$ will be placed on the line passing via the coordinates (0,0) and point $Pi_1$. Monitoring point $P_2$ will be placed on the line passing via the coordinates (MaxCode, MaxCode) and point $Pi_2$. The position of monitoring point $P_1$ can then be determined according to an additional value representative of a force $F_{black}$ starting from point (0,0) and weighting the position of first monitoring point $P_1$ on the associated line. In fact, in the example, the more it is sought to accentuate the detail of the shadows, the greater the force $F_{black}$ will be. Typically, different forces will be able to be proposed to the user. These forces can be adjusted according to the characteristics of the image sensor used such as, for example, its noise. According to the sensor, for an illumination value of the latter, a tolerated noise threshold will be able to be associated, the value of the forces being able to vary so long as the threshold has not been reached. In the same way, monitoring point $P_2$ can be determined according to an additional value representative of a force $F_{white}$ starting from the point (MaxCode, MaxCode) and weighting the position of monitoring point $P_2$ on the associated line.

The mean values $V_{m1}$ and $V_{m2}$ used to determine monitoring points $P_1$ and $P_2$, or intermediate points $Pi_1$ and $Pi_2$, may be calculated taking account of the luminance value or the green component value of the pixels, which is often closest to its luminance. According to an alternative embodiment, it is possible to calculate a mean value for each of the channels (for example, the Red, Green, Blue components) of the pixels of the light area and for each of the channels of the pixels of the dark area. To determine monitoring point $P_1$ or intermediate point $Pi_1$, the maximum value of the mean values of the channels of the dark area is taken. To determine monitoring point $P_2$ or intermediate point $Pi_2$, the minimum value of the mean values of the channels of the light area is taken. This enables the shades of color of the image to be kept, even with an image locally having a blue or red dominant.

When all the monitoring points have been determined for all the areas, before the step of modifying the tone curves of the areas, the values of monitoring points $P_1$, $P_2$ of an area can be adjusted with respect to an adjacent area to limit the relative deviations between the two areas. To adjust the monitoring points $P_1$, it is possible to determine for each area a line having ends defined by the points (0,0) and $P_1$. The slopes of the lines obtained are then sorted from the slope the closest to y=x (i.e. a slope of 1) to the slope the farthest from y=x. Considering the area where the slope is closest to 1, the slopes of the areas adjacent to the area considered are modified so that a slope difference criterion is respected. Modification of the slopes results in modification of monitoring points $P_1$ of the adjacent areas according to the value of monitoring point $P_1$ of the area considered and to the difference criterion. For example, if an area adjacent to the area considered has a value of monitoring point $P_1$ between the value of monitoring point $P_1$ of the area considered and the value of monitoring point $P_1$ of the area considered plus the difference criterion, the value of monitoring point $P_1$ of the adjacent area will not be modified, if not, the value of monitoring point $P_1$ of the adjacent area will be modified so as to be equal to the value of monitoring point $P_1$ of the area considered plus the difference criterion.

The slopes of the different areas are then resorted, and the considered area is changed taking the area having the closest associated slope value to that of the previous considered area. The monitoring point of an already considered area cannot be modified. The same principle is applied to monitoring points $P_2$ for slopes defined by lines having ends that are defined by points $P_2$ and (MaxCode, MaxCode). In the example, the slopes are all greater than or equal to 1. The above-mentioned difference criterion is preferably a slope difference of 10% maximum with respect to the value of the area considered.

The method for improving the luminosity among other things enables the rendering of images having a high dynamic range, or that are photographed against the light, to be improved. By underexposing, the method in particular enables the number of saturated pixels (white pixels) in the highlights to be reduced, while recovering the information in the lowlights by re-exposing the pixels concerned.

The method for improving the visual perception of the image can also comprise improving the contrast of the image by histogram processing, either independently or in combination with the steps relative to improving the luminosity (treatment of the tone curve). When it is taken in an independent manner, the method for improving the contrast, on output of step E1 of FIG. 3, comprises determination, for each area, of a histogram from the values of the pixels of the area.

Figure 10:
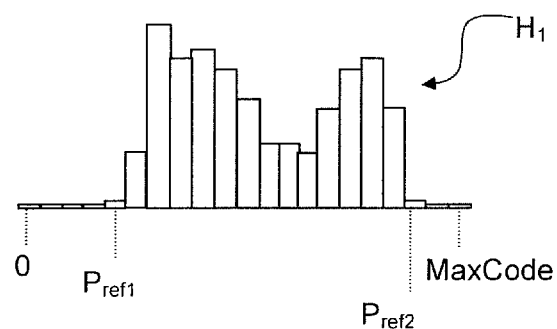
FIGS. 10 to 14 illustrate histograms enabling a reference value of the dark pixels and a reference value of the light pixels to be determined in different manners, according to the present invention.

In FIG. 10, a reference value $P_{ref1}$ is determined from histogram $H_1$, for the corresponding area, corresponding to a value below which a reference percentage of pixels of the area is located, and another reference value $P_{ref2}$ is determined, corresponding to a value above which the reference percentage of pixels of the area is located. The reference percentage of pixels targeted above is preferably comprised between 0.2% and 1% of the number of pixels of the area. A wider range may be preferred according to the sensor and/or to the camera lens used to photograph the scene representative of the image. Reference values $P_{ref1}$ and $P_{ref2}$ can also be determined from reference percentages of different pixels. The reference percentage of pixels corresponds to the modifications typically made to the images from the values originating from a sensor to improve the contrast of the images by modifying the histogram.

Histogram $H_1$ is representative of an area, and comprises a lower boundary indicated by 0 and an upper boundary indicated by MaxCode. These boundaries enable the different values a pixel can take over the width of the histogram to be encoded. All the pixels of the area concerned are distributed in this histogram $H_1$. Zero (0) can represent a black pixel and MaxCode a white pixel, and reference value $P_{ref1}$ is then representative of the dark pixels and reference value $P_{ref2}$ is representative of the light pixels. Thus, if the highlights are to be preserved, a very low reference percentage associated with $P_{ref2}$ will be chosen in the top part of the histogram. In the bottom part of the histogram, representative of the dark part, the dark pixels will tend to be kept or the grey pixels will be made to tend to black, and the reference percentage chosen to be associated with $P_{ref1}$ will therefore be higher than that associated with $P_{ref2}$.

After reference values $P_{ref1}$ and $P_{ref2}$ have been determined, the histogram of the associated area can be stretched so as to distribute the frequencies of occurrence of the pixels situated between reference values $P_{ref1}$ and $P_{ref2}$ of pixels over the width of the histogram. For example, stretching of the histogram of an area can be performed by modifying each pixel of the area by applying the formula $$\text{output}_{x,y} = (\text{input}_{x,y} - P_{ref1}) \times \frac{\text{MaxCode}}{P_{ref2} - P_{ref1}};$$

where $\text{output}_{x,y}$ is the output value of the pixel of coordinates x and y after stretching, and $\text{input}_{x,y}$ is the value of the pixel of coordinates x and y before stretching.

The steps of the histogram of determining reference values $P_{ref1}$ and $P_{ref2}$ and of stretching the histogram can be performed successively for a determined area before going on to the next area. It is also possible to establish all the histograms in a first stage, all the reference values in a second stage, and finally to stretch all the histograms in a third stage. This enables the two reference values $P_{ref1}$ and $P_{ref2}$ of a given area to be modified if required according to the reference values of one or of adjacent areas so as to avoid too great a disparity of the stretched histograms of two adjacent areas which would then become difficult to smooth. This step can be performed by limiting the relative deviations between adjacent areas for each of reference values $P_{ref1}$ and $P_{ref2}$. For $P_{ref1}$, the areas are sorted in increasing manner according to reference value $P_{ref1}$, and then starting from the minimum value (called "considered area"), the values $P_{ref1}$ of the adjacent areas are modified according to the value $P_{ref1}$ of the considered area. For example, if an adjacent area has a value $P_{ref1}$ that is greater than the value $P_{ref1}$ of the considered area plus a predetermined threshold, the value $P_{ref1}$ of the adjacent area will be adjusted to the value $P_{ref1}$ of the considered area plus the threshold, and if the adjacent area has a value $P_{ref1}$ between the value $P_{ref1}$ of the considered area and the value $P_{ref1}$ of the considered area plus the threshold, the value $P_{ref1}$ of the adjacent area will not be changed.

The areas are then re-sorted in increasing manner according to $P_{ref1}$, and the considered area is changed taking a new considered area having a value of $P_{ref1}$ closest to that of the previous considered area. A reference value $P_{ref1}$ of an already processed considered area will not be modified. The order of values $P_{ref1}$ of the considered areas therefore does not change with sorting. Starting with the smallest value enables the value that stretches the least to be kept. For $P_{ref2}$, the principle is the same except that the areas are sorted in decreasing manner according to $P_{ref2}$ and then considered from the highest to the lowest value $P_{ref2}$. Adjustment then starts from the considered area associated with the highest reference value $P_{ref2}$, the threshold (able to be different from that of $P_{ref1}$) then being subtracted from the value $P_{ref2}$ of the considered area to perform adjustment of the values $P_{ref2}$ of the areas adjacent to the considered area. A value $P_{ref2}$ of an area adjacent to the considered area and between the value $P_{ref2}$ of the considered area and the value $P_{ref2}$ of the considered area less the threshold is not changed, and a value $P_{ref2}$ of an adjacent area lower than the value of the considered area less the threshold is adjusted to the value of $P_{ref2}$ of the considered area less the threshold. The above-mentioned threshold can correspond to a difference of 5% of the considered value.

Following stretching of the histogram of the different areas, the latter are processed to smooth the passage between two adjacent areas to obtain a coherent image. In FIG. 10, each bar of the histogram $H_1$ gives a count of the occurrences of a single specific pixel value. Each bar of the histogram is typically associated with a memory register storing the number of occurrences of an associated pixel value in the area.

According to the reference percentage of pixels and knowing the number of pixels of the area, reference values $P_{ref1}$ and $P_{ref2}$ can thereby be determined with precision.

However, if this methodology is applied without optimization, as many registers are required as there are possible values for histogram $H_1$, i.e. MaxCode+1, which may not be practical in a camera for the public at large. A requirement therefore may exist to optimize determination of reference values $P_{ref1}$ and $P_{ref2}$ to limit the number of necessary registers.

Figure 11:
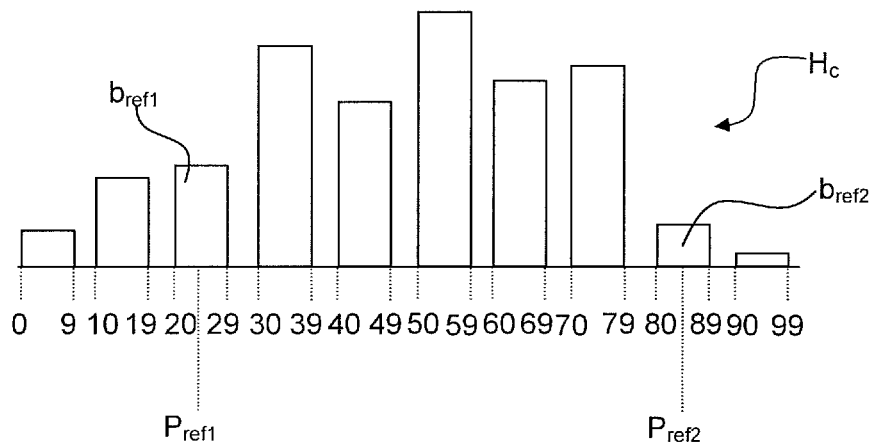

The steps described in the following, based on the use of a compact histogram and of a partial histogram, meet this requirement. In FIG. 11, determination of the histogram comprises formation of a compact histogram $H_c$ taking account of all the pixels of the corresponding area. Each bar of compact histogram $H_c$ consolidates, i.e. gives an account of, the occurrences of pixels in a range of values bounded by an associated minimum value and maximum value. In the particular example of FIG. 11, compact histogram $H_c$ comprises ten consolidated bars, each bar being associated with 10 values, in the context where the values of the pixels of each area are encoded on 100 values (from 0 to 99).

On reading of this compact histogram $H_c$ and knowing the number of pixels of the area, it is possible to determine in which consolidated bar $b_{ref1}$ of compact histogram $H_c$ reference value $P_{ref1}$ is located. It is in fact known that, starting from the left of the histogram, the reference percentage of pixels represents all of the pixels of the first bar and of the second bar, and a part of those of the third bar. However, reading of compact histogram $H_c$ only makes it possible to associate an approximate value of the reference value sought for. It is just possible, in the example considered, to know that the exact value is comprised in consolidated bar $b_{ref1}$ between boundaries 20 and 29.

Figure 12:
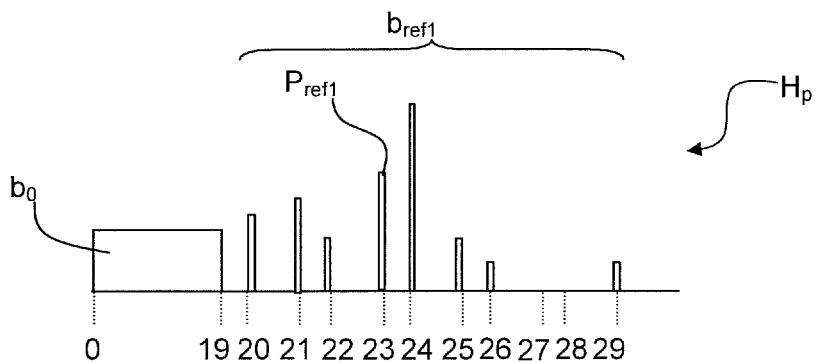

FIG. 12 illustrates the creation of a partial histogram (in the sense that it is detailed in localized manner only) enabling determination of reference value $P_{ref1}$ to be performed more finely. In this partial histogram $H_p$, the pixels of a value strictly lower than the minimum boundary of bar $b_{ref1}$ are taken into account in a single consolidated bar $b_0$. Bar $b_{ref1}$ is then segmented to finely tune the distribution of the values of the pixels. What is meant by "finely tune" is that bar $b_{ref1}$ is divided into a plurality of bars, each bar of the plurality of bars conventionally corresponding to a single pixel value, and that the exact value of reference value $P_{ref1}$ in the partial histogram will then be able to be determined from among the several bars resulting from segmentation of bar $b_{ref1}$. According to one embodiment, what is meant by "finely tune" is that each of the bars of the plurality of bars corresponds to several values of pixels of bar $b_{ref1}$, and an approximate value of reference value $P_{ref1}$ will then be able to be determined.

This determination of the histogram made from a compact histogram $H_c$ and from a partial histogram $H_p$ may limit the registers necessary to determine reference value $P_{ref1}$. Creation of compact histogram $H_c$ as defined in the particular example of FIGS. 11 and 12 enables the number of registers to be limited to 10 for the compact histogram. Creation of the partial histogram requires 11 registers, 10 of these being able to be re-used from the compact histogram. In creation of the partial histogram of FIG. 12, the pixels whose values are situated above the maximum boundary of bar $b_{ref1}$ do not need to be taken into account in the partial histogram. The same principle applies to determination of reference value $P_{ref2}$ by way of a determined bar $b_{ref2}$ starting from the right of histogram $H_c$.

Figure 13:
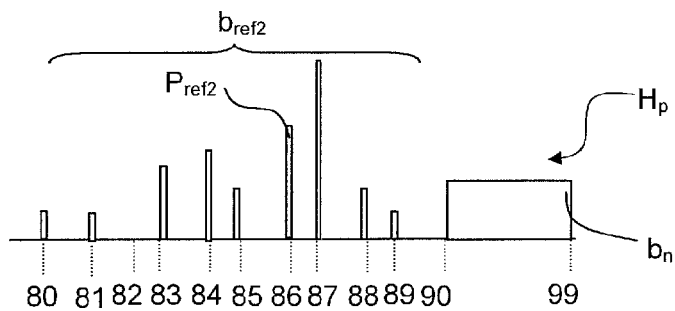

In FIG. 13, in a partial histogram $H_p$ assisting in determining reference value $P_{ref2}$, the pixels whose values are strictly higher than the maximum boundary of bar $b_{ref2}$ are taken into account in a single bar $b_n$ (pixels whose values are comprised between 90 and 99) and the determined bar $b_{ref2}$ (for the values from 80 to 89) is segmented to finely tune the distribution of the values in order to select reference value $P_{ref2}$ with precision from partial histogram $H_p$. The pixels of the area whose values are situated under the minimum boundary of determined bar $b_{ref2}$ are not taken into account in partial histogram $H_p$.

According to an alternative embodiment, a single compact histogram $H_c$ and a single partial histogram are required to determine the two reference values $P_{ref1}$ and $P_{ref2}$. In this alternative embodiment, a bar $b_{ref1}$ comprising reference value $P_{ref1}$ and a bar $b_{ref2}$ comprising reference value $P_{ref2}$ are determined from compact histogram $H_c$ of FIG. 11 as described in the following.

Figure 14:
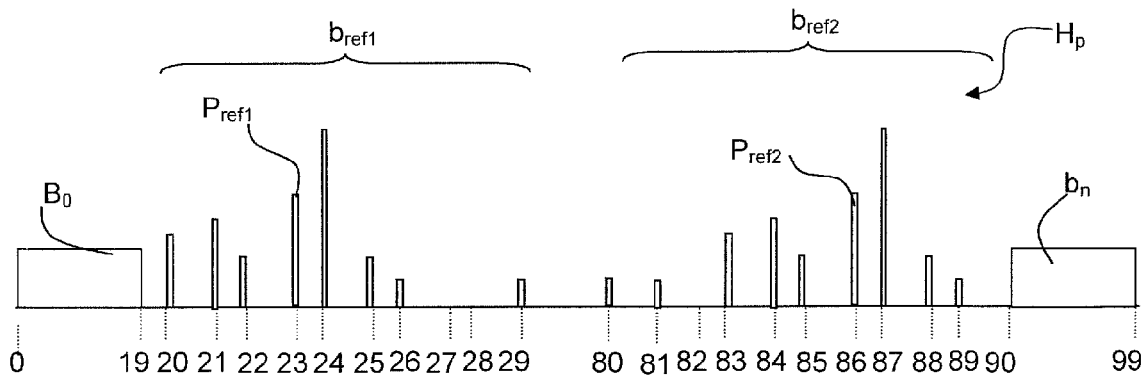

FIG. 14 illustrates the single partial histogram created in the following. This partial histogram $H_p$ is drawn up in the following manner:
 1. the pixels of strictly lower value than the minimum value of bar $b_{ref1}$ are taken into account in a single bar $b_0$;
 2. the pixels of strictly higher value than the maximum value of bar $b_{ref2}$ are taken into account in a single bar $b_n$;
 3. the pixels of higher value than the maximum boundary of bar $b_{ref1}$ and of lower value than the minimum boundary of bar $b_{ref2}$ are not taken into account; and,
 4. bars $b_{ref1}$ and $b_{ref2}$ are finely tuned, as described in the foregoing, so as to determine reference values $P_{ref1}$ and $P_{ref2}$ as closely as possible.

In this alternative embodiment, it then becomes possible to limit the number of registers to 10 in a first run-through of the pixels of the area to determine full histogram $H_c$, and then to 22 in a second run-through of the pixels of the area to determine partial histogram $H_p$, whereas in the embodiment of FIG. 10, 100 registers would have been necessary. This embodiment further limits analysis of the pixels to two run-throughs whereas, taken independently, the determinations of $P_{ref1}$ and $P_{ref2}$ would have required four pixel run-throughs, therefore resulting in resources being saved.

In some embodiments, when creating the histogram or histograms, the value of a pixel corresponds to its luminance value. The luminance value is preferred as it enables the three color components to be weighted to obtain a single value and to therefore plot a single histogram. Instead of the luminance value, it is also possible to use the value of the green component of the image when the latter is encoded in RGB components (Red, Green, Blue channels).

According to an alternative embodiment, the pixel having three red, green and blue color components, each having their own value comprised between 0 and MaxCode which is associated therewith, it is possible to draw up a histogram per color component for each area and to process each histogram of the area independently in the manner described in the foregoing. This enables better results to be obtained, but has the drawback of multiplying the calculations and the number of histograms, which means that the embodiment using the luminance value or the green component will be preferred. It is also possible to take account of the minimum value of the three RGB components of the pixel for each pixel in a first compact histogram, and of the maximum value of the three RGB components of the pixel for each pixel in a second compact histogram. The value $P_{ref1}$ is then determined from the first compact histogram taking account of the minimum values, for example, by forming a partial histogram as seen in the above. The value $P_{ref2}$ is in this case then determined from the second compact histogram taking account of the maximum values, for example, by forming a partial histogram as seen in the above. This approach is particularly useful for cases where, for example, an area has its blue channel close to saturation (Maxcode) but a weak luminance. In this case, if the two compact histograms are not used, upward stretching of one only of the histograms using the luminance would crush the blue colors.

Figure 15:
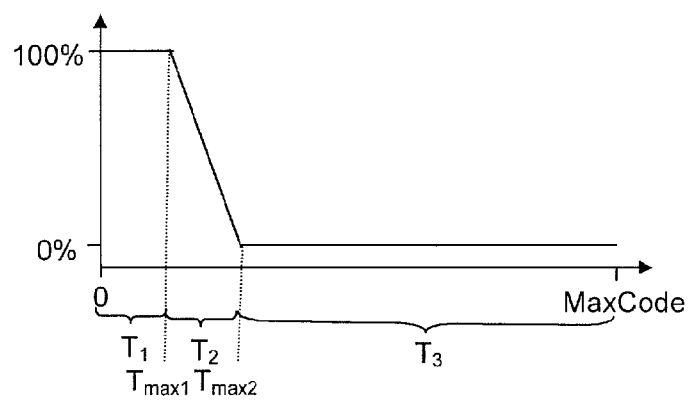
FIGS. 15 and 16 illustrate weighting curves of the reference values of the pixels, according to the present invention.
Figure 16:
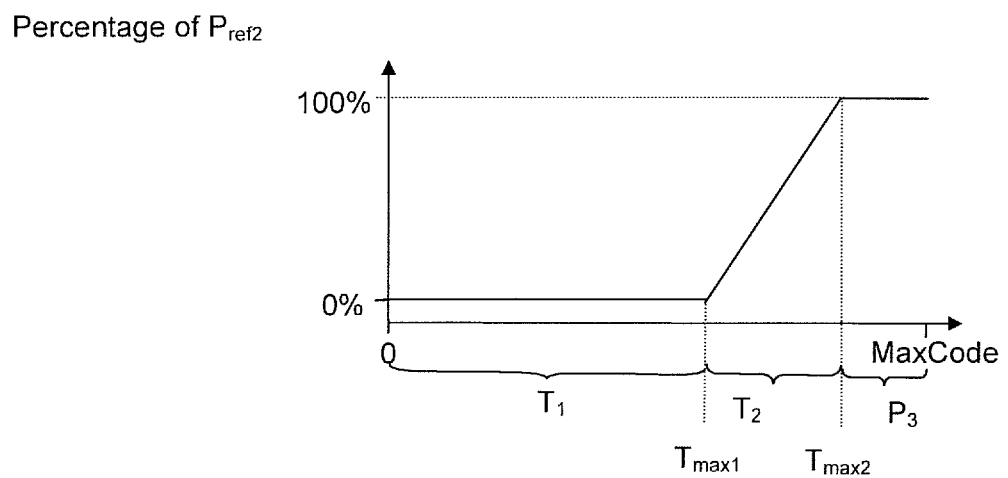

According to an improvement, to avoid denaturing the image, reference values $P_{ref1}$ and $P_{ref2}$ determined from the histogram or histograms can be corrected by way of charts. FIGS. 15 and 16 illustrate such charts. FIG. 15 illustrates the variation of a weighting coefficient of reference value $P_{ref1}$ according to the values of pixels (from 0 to MaxCode). The plot of FIG. 15 comprises three sections. If reference value $P_{ref1}$ determined by reading of the histogram is within section $T_1$, the effective value used for stretching will be that determined by reading of the histogram (weighting coefficient of 100%). If the determined reference value $P_{ref1}$ is within section $T_2$, the effective value used for stretching will be a percentage between 100% and 0% of the value determined by reading of the histogram. If the determined reference value $P_{ref1}$ is comprised within section $T_3$, the effective value used for stretching will be 0.

FIG. 16 illustrates the variation of a weighting coefficient of reference value $P_{ref2}$ according to the values of pixels (from 0 to MaxCode). The plot of FIG. 16 also comprises three sections. From left to right, if the determined reference value $P_{ref2}$ is comprised within section $T_1$, the effective value used for stretching will be equal to MaxCode. If the determined reference value $P_{ref2}$ is within section $T_2$, the effective value used for stretching will be a percentage comprised between 0% and 100% of the determined value. If the determined reference value $P_{ref2}$ is within section $T_3$, the effective value used for stretching will be the value determined by reading of the histogram.

These corrections enable calculations which would be liable to denature the images to be limited. To avoid denaturing the images, a maximum value $T_{max1}$ of section $T_1$ equal to 10% of MaxCode and a maximum value $T_{max2}$ of section $T_2$ equal to 50% of MaxCode are preferably taken for the value $P_{ref1}$. A maximum value $T_{max1}$ of section $T_1$ equal to 50% of the range (i.e. MaxCode) and a maximum value $T_{max2}$ of section $T_2$ equal to 90% of the range (i.e. MaxCode) may be further taken for the value $P_{ref2}$. These values can then be adjusted to the characteristics of the image source and of the targeted application.

In other embodiments, when the contrast and luminosity settings are combined for each area, the step of improving the luminosity is performed before the step designed to improve the contrast, as the histogram stretching can result in a loss of information. In other words, for each area the tone curve is modified before the histogram or histograms are modified, and the joins between the areas are then smoothed in a single operation after the tone curve and the histogram or histograms have been modified. It is also possible to smooth the joins and to then modify the histograms of all the areas, after the tone curves of all the areas have been modified, before performing a new smoothing step. This enables the two processing operations to be separated and a breakdown to be had into different areas, if required, in order to improve the final result. A single smoothing naturally also enables a satisfactory result to be obtained, although of lesser quality.

The areas processed when the luminosity and contrast are improved can be identical, in which case, the step of dividing the image into areas can be performed in one go. It is nevertheless possible to divide the areas differently according to the type of process (improving the luminosity or the contrast). In this case, the tone curves are modified, and the areas are connected by smoothing so as to form intermediate pixels. An intermediate pixel can subsequently be taken into account in a different area and will be modified in contrast according to this area. This separation of the steps with two smoothing operations guarantees that the monitoring points and the reference values are associated with processing of the contrast, or respectively of the luminosity.

Additionally, before the image is divided into areas and before the improvement steps of the luminosity and/or contrast of the areas are performed, a preliminary step of global improvement of the contrast is scheduled. The step of global improvement of the contrast can comprise all the steps performed to improve the contrast of an area with the sole difference that all the pixels of the image are impacted. The advantage of this preliminary step is to guarantee that the references of the whites and of the blacks are correct.

According to an alternative embodiment, after the image has been divided into areas, the adjacent areas can be locally superposed. In this case, the statistics enabling the monitoring points or the reference values to be generated by analysis of the areas are made on all the pixels of the area. The modifications of the pixels (histogram and/or tone curve) are on the other hand made on non-superposed portions of areas.

According to an embodiment, the final image obtained on completion of the processes described in the above can be modified in global manner by a conversion function described in the following after taking on input a value of a Red, Green, or Blue (RGB) pixel channel and the luminance value of the pixel. The processing that follows is applied on the three red, green and blue components of each pixel.

First of all, a difference $\text{diff}_{RGB}$ between the input value of the color channel to be processed and the luminance value of the pixel is calculated:

$$\text{diff}_{RGB} = \text{Pixel}_{RGB} - \text{Pixel}_{lum};$$

where $\text{Pixel}_{RGB}$ is representative of the value of a color channel of the input pixel, and $\text{Pixel}_{lum}$ is representative of the luminance value of the input pixel. An input $\text{gain}_{RGB}$ is then calculated in the following manner:

$$\text{gain}_{RGB} = \text{gain}_{am} \times (\text{Pixel}_{RGB} + \text{Pixel}_{lum});$$

where $\text{gain}_{am}$ corresponds to the gain of the pixel obtained following the smoothing step of the adjacent areas after the histogram and/or tone curve modification steps for all the areas.

The output value of $\text{PixelOut}_{RGB}$ is then obtained in the following manner:

$$\text{PixelOut}_{RGB} = \frac{\text{diff}_{RGB} + \text{gain}_{RGB}}{2}.$$

Such a processing prevents saturation of the values of the pixels of the image. The value $\text{PixelOut}_{RGB}$ corresponds to the final value of a pixel after improvement of the image.

The method for improving the perception as described in the foregoing can be implemented in any photographic capture device, or in any device for processing a digital image comprising an image source. The image source can be an image sensor, a memory, or an image flux. If the image source is a sensor or another element giving a raw version of the image, before the step of dividing the image into several areas, the data associated with the raw image is sent to a converter transforming the raw image into a RGB image. The different steps of the method for improving the perception can then be performed by a processing module connected to a storage memory to store the final output image on which the modifications have been applied.

The method for improving the perception may make it possible, for example, to separate the range of an image into dark and light colors to improve the contrast and luminosity in independent manner for each of the sub-ranges. The combination of independent processing per area and possibly by light and dark areas of the same area may enable the contrast and luminosity to be more finely tuned. The method may limit the effects due to transitions between areas and to squeezing of the mid tones. Preferably, the method may be particularly efficient for very wide areas, while at the same time enabling simple processing resulting in improvement of the contrast and luminosity.

That which is claimed is:

1. A method for processing an image comprising:
    using a processor and memory for dividing the image into a plurality of areas;
    using the processor and memory for modifying at least one of a tone curve and a histogram of each area, the modifying of the tone curve of each area comprising
        determining a first set of pixels corresponding to underexposed parts of each area and a second set of pixels corresponding to overexposed parts of each area,
        determining a first monitoring point representative of a mean value of the first set of pixels,
        determining a second monitoring point representative of a mean value of the second set of pixels, and
        making the tone curve tend towards a curve as a function of the first and second monitoring points; and
    using the processor and memory for smoothing joints between adjacent areas in the image.

2. The method according to claim 1 wherein the first monitoring point and the second monitoring point are also representative of target exposure values of the first and second sets of pixels, respectively.

3. The method according to claim 1 wherein the first set of pixels and the second set of pixels comprise an intersection.

4. The method according to claim 1 further comprising:
    calculating the mean value of the first set of pixels based upon at least one of a luminance and a green component of associated pixels; and
    calculating the mean value of the second set of pixels based upon at least one of a luminance and a green component of the associated pixels.

5. The method according to claim 1 wherein modifying the histogram of each area comprises:
    determining a histogram for values of pixels of each area;
    determining a first reference value of pixels where a first reference percentage of pixels of each area have values less than the first reference value of pixels;
    determining a second reference value of pixels where a second reference percentage of pixels of each area have values greater than the second reference value of pixels; and
    stretching the histogram by distributing frequencies of occurrence of pixels situated between the first and second reference values over a width of the histogram.

6. The method according to claim 5 wherein determining the histogram and the first reference value of the pixels of each area comprise:
    forming a compact histogram based upon all of the pixels of each area, each bar of the compact histogram being based upon pixels with values between a minimum boundary and a maximum boundary associated with the bar;

determining a bar of the compact histogram in which the first reference value is located;

creating a partial histogram in which values of pixels lower than the minimum boundary of the determined bar are included in a single bar, and the determined bar is segmented to finely tune distribution of the values of the pixels; and finding the first reference value of the pixels in the partial histogram.

7. The method according to claim 6 wherein when the partial histogram is created, pixels of an area with values greater than the maximum boundary of the determined bar are not included in the partial histogram.

8. The method according to claim 5 wherein determining the histogram and the second reference value comprise:

forming a compact histogram based upon all pixels of each area, each bar of the compact histogram being based upon pixels with values between a minimum boundary and a maximum boundary associated with the bar;

determining a bar of the compact histogram in which the second reference value is located;

creating a partial histogram in which values of the pixels greater than the maximum boundary of the determined bar are included in a single bar, and the determined bar is segmented to finely tune distribution of the values of the pixels; and finding the second reference value in the partial histogram.

9. The method according to claim 8 wherein when the partial histogram is created, pixels of an area with values less than the minimum boundary of the determined bar are not included in the partial histogram.

10. The method according to claim 1 further comprising, before the image is divided into areas, globally adjusting a contrast of the image.

11. The method according to claim 1 wherein the curve comprises a Bezier curve.

12. A method for processing an image comprising:

using a processor and memory for globally adjusting a contrast of the image;

using the processor and memory for after adjusting the contrast of the image, dividing the image into a plurality of areas;

using the processor and memory for modifying a tone curve and a histogram of each area, the modifying comprising determining a first set of pixels corresponding to underexposed parts of each area and a second set of pixels corresponding to overexposed parts of each area, determining a first monitoring point representative of a mean value of the first set of pixels, determining a second monitoring point representative of a mean value of the second set of pixels, and making the tone curve tend towards a curve as a function of the first and second monitoring points; and using the processor and memory for smoothing joints between adjacent areas in the image.

13. The method according to claim 12 wherein modifying the tone curve of each area comprises:

determining a first set of pixels corresponding to underexposed parts of each area and a second set of pixels corresponding to overexposed parts of each area;

determining a first monitoring point representative of a mean value of the first set of pixels;

determining a second monitoring point representative of a mean value of the second set of pixels; and making the tone curve tend towards a curve as a function of the first and second monitoring points.

14. The method according to claim 13 wherein the first monitoring point and the second monitoring point are also representative of target exposure values of the first and second sets of pixels, respectively.

15. The method according to claim 13 wherein the first set of pixels and the second set of pixels comprise an intersection.

16. The method according to claim 13 further comprising:

calculating the mean value of the first set of pixels based upon at least one of a luminance and a green component of associated pixels; and calculating the mean value of the second set of pixels based upon at least one of a luminance and a green component of the associated pixels.

17. The method according to claim 12 wherein modifying the histogram of each area comprises:

determining a histogram for values of pixels of each area;

determining a first reference value of pixels where a first reference percentage of pixels of each area have values less than the first reference value of pixels;

determining a second reference value of pixels where a second reference percentage of pixels of each area have values greater than the second reference value of pixels; and stretching the histogram by distributing frequencies of occurrence of pixels situated between the first and second reference values over a width of the histogram.

18. A method for processing an image comprising:

using a processor and memory for dividing the image into a plurality of areas;

using the processor and memory for modifying a tone curve of each area, the modifying of the tone curve of each area comprising determining a first set of pixels corresponding to underexposed parts of each area and a second set of pixels corresponding to overexposed parts of each area, determining a first monitoring point representative of a mean value of the first set of pixels, determining a second monitoring point representative of a mean value of the second set of pixels, and making the tone curve tend towards a curve as a function of the first and second monitoring points; and using the processor and memory for smoothing joints between adjacent areas in the image.

19. The method according to claim 18 wherein the first monitoring point and the second monitoring point are also representative of target exposure values of the first and second sets of pixels, respectively.

20. The method according to claim 18 wherein the first set of pixels and the second set of pixels comprise an intersection.

21. The method according to claim 18 further comprising:

calculating the mean value of the first set of pixels based upon at least one of a luminance and a green component of associated pixels; and calculating the mean value of the second set of pixels based upon at least one of a luminance and a green component of the associated pixels.

22. A method for processing an image comprising:

using a processor and memory for dividing the image into a plurality of areas;

using the processor and memory for modifying a histogram of each area, the modifying of the histogram of each area comprising determining a histogram for values of pixels of each area, determining a first reference value of pixels where a first reference percentage of pixels of each area have values less than the first reference value of pixels, determining a second reference value of pixels where a second reference percentage of pixels of each area have values greater than the second reference value of pixels, and stretching the histogram by distributing frequencies of occurrence of pixels situated between the first and second reference values over a width of the histogram; and using the processor and memory for smoothing joints between adjacent areas in the image.

23. The method according to claim 22 wherein determining the histogram and the first reference value of the pixels of each area comprise:

forming a compact histogram based upon all of the pixels of each area, each bar of the compact histogram being based upon pixels with values between a minimum boundary and a maximum boundary associated with the bar;

determining a bar of the compact histogram in which the first reference value is located;

creating a partial histogram in which values of pixels lower than the minimum boundary of the determined bar are included in a single bar, and the determined bar is segmented to finely tune distribution of the values of the pixels; and finding the first reference value of the pixels in the partial histogram.

24. The method according to claim 23 wherein when the partial histogram is created, pixels of an area with values greater than the maximum boundary of the determined bar are not included in the partial histogram.

25. An image sensor for processing an image comprising:
a processor and memory cooperating therewith and configured to divide the image into a plurality of areas, modify at least one of a tone curve and a histogram of each area, the modifying of the tone curve of each area comprising determining a first set of pixels corresponding to underexposed parts of each area and a second set of pixels corresponding to overexposed parts of each area, determining a first monitoring point representative of a mean value of the first set of pixels, determining a second monitoring point representative of a mean value of the second set of pixels, and making the tone curve tend towards a curve as a function of the first and second monitoring points, and smooth joints between adjacent areas in the image.

26. The image sensor according to claim 25 wherein the first monitoring point and the second monitoring point are also representative of target exposure values of the first and second sets of pixels, respectively.

27. The image sensor according to claim 25 wherein the first set of pixels and the second set of pixels comprise an intersection.

28. The image sensor according to claim 25 wherein said processor and memory are configured to:

calculate the mean value of the first set of pixels based upon at least one of a luminance and a green component of associated pixels; and calculate the mean value of the second set of pixels based upon at least one of a luminance and a green component of the associated pixels.

29. The image sensor according to claim 25 wherein said processor and memory are configured to modify the histogram of each area by at least:

determining a histogram for values of pixels of each area;

determining a first reference value of pixels where a first reference percentage of pixels of each area have values less than the first reference value of pixels;

determining a second reference value of pixels where a second reference percentage of pixels of each area have values greater than the second reference value of pixels; and stretching the histogram by distributing frequencies of occurrence of pixels situated between the first and second reference values over a width of the histogram.

30. The image sensor according to claim 29 wherein said processor and memory are configured to determine the histogram and the first reference value of the pixels of each area by at least:

forming a compact histogram based upon all of the pixels of each area, each bar of the compact histogram being based upon pixels with values between a minimum boundary and a maximum boundary associated with the bar;

determining a bar of the compact histogram in which the first reference value is located;

creating a partial histogram in which values of pixels lower than the minimum boundary of the determined bar are included in a single bar, and the determined bar is segmented to finely tune distribution of the values of the pixels; and finding the first reference value of the pixels in the partial histogram.

31. An image sensor for processing an image comprising:
a processor and memory cooperating therewith and configured to divide the image into a plurality of areas, modify a tone curve of each area, the modifying of the tone curve of each area comprising determining a first set of pixels corresponding to underexposed parts of each area and a second set of pixels corresponding to overexposed parts of each area, determining a first monitoring point representative of a mean value of the first set of pixels, determining a second monitoring point representative of a mean value of the second set of pixels, and making the tone curve tend towards a curve as a function of the first and second monitoring points, and smooth joints between adjacent areas in the image.

32. The image sensor according to claim 31 wherein the first monitoring point and the second monitoring point are also representative of target exposure values of the first and second sets of pixels, respectively.

33. The image sensor according to claim 31 wherein the first set of pixels and the second set of pixels comprise an intersection.

34. The image sensor according to claim 31 wherein said processor and memory are configured to:

calculate the mean value of the first set of pixels based upon at least one of a luminance and a green component of associated pixels; and calculate the mean value of the second set of pixels based upon at least one of a luminance and a green component of the associated pixels.

35. An image sensor for processing an image comprising:
a processor and memory cooperating therewith and configured to divide the image into a plurality of areas, modify a histogram of each area, the modifying of the histogram of each area comprising determining a histogram for values of pixels of each area, determining a first reference value of pixels where a first reference percentage of pixels of each area have values less than the first reference value of pixels, determining a second reference value of pixels where a second reference percentage of pixels of each area have values greater than the second reference value of pixels, and stretching the histogram by distributing frequencies of occurrence of pixels situated between the first and second reference values over a width of the histogram, and smooth joints between adjacent areas in the image.

36. The image sensor according to claim 35 wherein said processor and memory are configured to determine the histogram and the first reference value of the pixels of each area by at least:

forming a compact histogram based upon all of the pixels of each area, each bar of the compact histogram being based upon pixels with values between a minimum boundary and a maximum boundary associated with the bar;

determining a bar of the compact histogram in which the first reference value is located;

creating a partial histogram in which values of pixels lower than the minimum boundary of the determined bar are included in a single bar, and the determined bar is segmented to finely tune distribution of the values of the pixels; and finding the first reference value of the pixels in the partial histogram.

37. The image sensor according to claim 36 wherein when the partial histogram is created, pixels of an area with values greater than the maximum boundary of the determined bar are not included in the partial histogram.

38. A method for processing an image comprising:

using a processor and memory for dividing the image into a plurality of areas;

using the processor and memory for modifying at least one of a tone curve and a histogram of each area, the modifying of the histogram of each area comprising determining a histogram for values of pixels of each area, determining a first reference value of pixels where a first reference percentage of pixels of each area have values less than the first reference value of pixels, determining a second reference value of pixels where a second reference percentage of pixels of each area have values greater than the second reference value of pixels, and stretching the histogram by distributing frequencies of occurrence of pixels situated between the first and second reference values over a width of the histogram; and using the processor and memory for smoothing joints between adjacent areas in the image.

39. An image sensor for processing an image comprising:

a processor and memory cooperating therewith and configured to divide the image into a plurality of areas, modify at least one of a tone curve and a histogram of each area, the modifying of the histogram of each area comprising determining a histogram for values of pixels of each area, determining a first reference value of pixels where a first reference percentage of pixels of each area have values less than the first reference value of pixels, determining a second reference value of pixels where a second reference percentage of pixels of each area have values greater than the second reference value of pixels, and stretching the histogram by distributing frequencies of occurrence of pixels situated between the first and second reference values over a width of the histogram, and smooth joints between adjacent areas in the image.

* * * * *